(12) United States Patent
Moon

(10) Patent No.: US 7,362,052 B2
(45) Date of Patent: Apr. 22, 2008

(54) EXTERNAL ELECTRODE FLUORESCENT LAMP

(75) Inventor: Jeong-Min Moon, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 188 days.

(21) Appl. No.: 11/118,353

(22) Filed: May 2, 2005

(65) Prior Publication Data

US 2006/0145618 A1   Jul. 6, 2006

(30) Foreign Application Priority Data

Dec. 30, 2004   (KR) ...................... 10-2004-0116925

(51) Int. Cl.
*H01J 61/00* (2006.01)
(52) U.S. Cl. ...................... 313/607; 313/594; 313/234; 313/491; 349/70
(58) Field of Classification Search ................ 313/607, 313/594, 234, 484, 491, 493; 348/70, 139
See application file for complete search history.

(56) References Cited

U.S. PATENT DOCUMENTS

| | | | | |
|---|---|---|---|---|
| 4,949,007 A | * | 8/1990 | Takagi et al. | 313/318.02 |
| 5,497,047 A | * | 3/1996 | Nakata et al. | 313/493 |
| 5,514,934 A | * | 5/1996 | Matsumoto et al. | 313/607 |
| 5,668,443 A | * | 9/1997 | Kawaguchi et al. | 315/169.1 |
| 5,932,960 A | | 8/1999 | Terada et al. | |
| 6,331,064 B1 | | 12/2001 | Nishiyama et al. | |
| 6,603,248 B1 | | 8/2003 | Trentelman | |
| 6,614,185 B1 | * | 9/2003 | Nishimura et al. | 313/607 |
| 6,806,647 B2 | | 10/2004 | Yamamoto et al. | |
| 2004/0004441 A1 | * | 1/2004 | Yano | 315/169.1 |
| 2004/0135484 A1 | * | 7/2004 | Lim | 313/234 |
| 2006/0181214 A1 | * | 8/2006 | Moon | 313/607 |

FOREIGN PATENT DOCUMENTS

JP              01159959 A  *  6/1989

* cited by examiner

*Primary Examiner*—Ashok Patel
(74) *Attorney, Agent, or Firm*—Birch, Stewart, Kolasch & Birch, LLP

(57) ABSTRACT

An external electrode fluorescent lamp and its fabrication method are disclosed. The method for fabricating the external electrode fluorescent lamp includes providing a cylindrical glass tube having a phosphor layer coated at its inner circumferential surface, a discharge gas injected therein and sealed at its ends, forming external electrodes at both end portions of the glass tube, and forming insulation films for sealing the external electrodes each insulation film having an opening exposing a portion of the corresponding external electrode.

9 Claims, 4 Drawing Sheets

EXTERNAL ELECTRODE FLUORESCENT LAMP

This application claims the priority benefit of the Korean Patent Application No. 2004-116925 filed on Dec. 30, 2004, which is hereby incorporated by reference.

BACKGROUND OF THE INVENTION

1. Field of the Invention

The present invention relates to an external electrode fluorescent lamp (EEFL) and to its fabrication method, and more particularly, to an external electrode fluorescent lamp having an external electrode disposed at both ends of the lamp with an insulation film formed at an outer surface thereof, and to its fabrication method.

2. Description of the Related Art

A cathode ray tube (CRT) is commonly employed as a display monitor, a television set, a measurement device or an information terminal, but because of its size and weight, the CRT cannot satisfy the demands for more compact and light-weight electronic products.

Thus, in line with the recent tendency that various electronic products are becoming more compact and lighter in weight, research is actively ongoing on an LCD (Liquid Crystal Display) Panel using a field optical effect, a PDP (Plasma Display Panel) using gas discharge and an ELD (Electro Luminescence Display) using a field emitting effect, in order to substitute for the CRT.

Among them, the LCD is most actively studied thanks to its advantages of having high picture quality, small average power consumption for the same screen size and a low amount of generated heat compared with the CRT. However, due to its characteristics of not emitting light, the LCD needs a light source. To accommodate this need, a reflective type LCD has been developed which uses an ambient natural light, but because of some restrictions in its use according to particular circumstances, an independent light source of the LCD itself is required. Such an independent light source is commonly referred to as a backlight, and as the light source, an EL (Electro Luminescence), an LED (Light Emitting Diode), a CCFL (Cold Cathode Fluorescent Lamp), an HCFL (Hot Cathode Fluorescent Lamp) and the like are used. Among them, especially, the CCFL which can be formed with a thin profile is in great demand.

The backlights are divided into a side light type backlight and a direct type backlight according to the location where the fluorescent lamp used as a light source is installed.

The side light type backlight is constructed such that a tubular line light source such as a fluorescent lamp is installed at the side of the liquid crystal panel and light emitted from the lamp is transmitted to the entire screen area of the liquid crystal panel by using a transparent light pipe, in a known manner.

As for the direct type backlight, its development was concentrated when the size of the LCD was increased to more than 20 inches. The direct type backlight is constructed such that a plurality of fluorescent lamps are arranged in a row at rear surface of an LCD panel and emit light to the entire surface of the LCD panel. With its high light use efficiency compared with the side light type backlight, the direct type backlight is commonly used for a large-screen LCD panel that requires high luminance.

A backlight for an LCD in accordance with the related art will now be described with reference to the accompanying drawings.

FIG. 1 is an exploded perspective view showing the direct type backlight in accordance with the related art and FIG. 2 shows a related art fluorescent lamp.

As shown in FIG. 1, the related art direct type backlight includes a plurality of fluorescent lamps 1, an outer case 3 fixing and supporting the fluorescent lamps 1 and a light scattering unit 5 disposed in front of the fluorescent lamps 1.

The light scattering unit 5 is provided to prevent the fluorescent lamps 1 themselves from visibly appearing on a display surface of the liquid crystal panel (not shown) and to make the light source have an overall uniform brightness distribution. The light scattering unit 5 can include a plurality of diffusion sheets and diffusion plates in order to increase the light scattering effect.

Also, in order to increase the use efficiency of the light, a reflection plate 7 for causing light generated from the fluorescent lamp 1 to be reflected toward a display unit of the liquid crystal panel is disposed at an inner surface of the outer case 3.

With reference to FIG. 2, the tubular type CCFL fluorescent lamps 1 are fixed in through holes formed at both sides of the outer case 3. Electrodes 2 for applying externally supplied power (not shown) are disposed at both ends at the inner side of a glass tube filled with a discharge gas, and a lead wire 9 is connected to each of the electrodes 2.

However, the related art fluorescent lamp has several disadvantages.

First, each fluorescent lamp 1 needs its own connector 11 attached to the lead wires 9 so as to permit the related art fluorescent lamp to be connected with a driving circuit.

In addition, in the related art fluorescent lamp, a hot cathode electrode or cold cathode electrode is installed at both ends of the inside of the glass tube. However, this installation process of the electrodes is quite difficult and can shorten the durability of the fluorescent lamp.

SUMMARY OF THE INVENTION

Therefore, an object of the present invention is to provide a fluorescent lamp which may be advantageously employed in a backlight and which is capable of improving the durability thereof and of simplifying a manufacturing process thereof by forming an external electrode at an outer circumferential surface of both ends of a fluorescent lamp, and which is also capable of protecting the external electrodes against an electric shock or noise, by forming an insulation film at an outer surface of the external electrodes.

To achieve at least the above object in whole or in part, there is provided an external electrode fluorescent lamp comprising a cylindrical glass tube, an external electrode installed at each end portion of the glass tube and capable of applying a voltage to the glass tube, an insulation film having an opening exposing a portion of each external electrode and sealing each external electrode, and electrode connecting lead units connected with each external electrode through the opening and capable of applying external power.

A phosphor layer is formed on an inner circumferential surface of the cylindrical glass tube, and after a discharge gas is injected into the cylindrical glass tube, both ends of the cylindrical glass tube are sealed. The external electrode fluorescent lamp of the present invention can also include a sealant for sealing the openings.

In order to achieve the above object, there is also provided a method for fabricating an external electrode fluorescent lamp for a backlight, including the steps of preparing a cylindrical glass tube, forming an external electrode at both end portions of the glass tube, and forming an insulation film having an opening exposing a portion of each external electrode and sealing the external electrodes.

BRIEF DESCRIPTION OF THE DRAWINGS

The invention will be described in detail with reference to the following drawings in which like reference numerals refer to like elements and wherein.

DETAILED DESCRIPTION OF THE INVENTION

The external electrode fluorescent lamp and its fabrication method in accordance with the present invention will be described with reference to the accompanying drawings.

Figure 1:
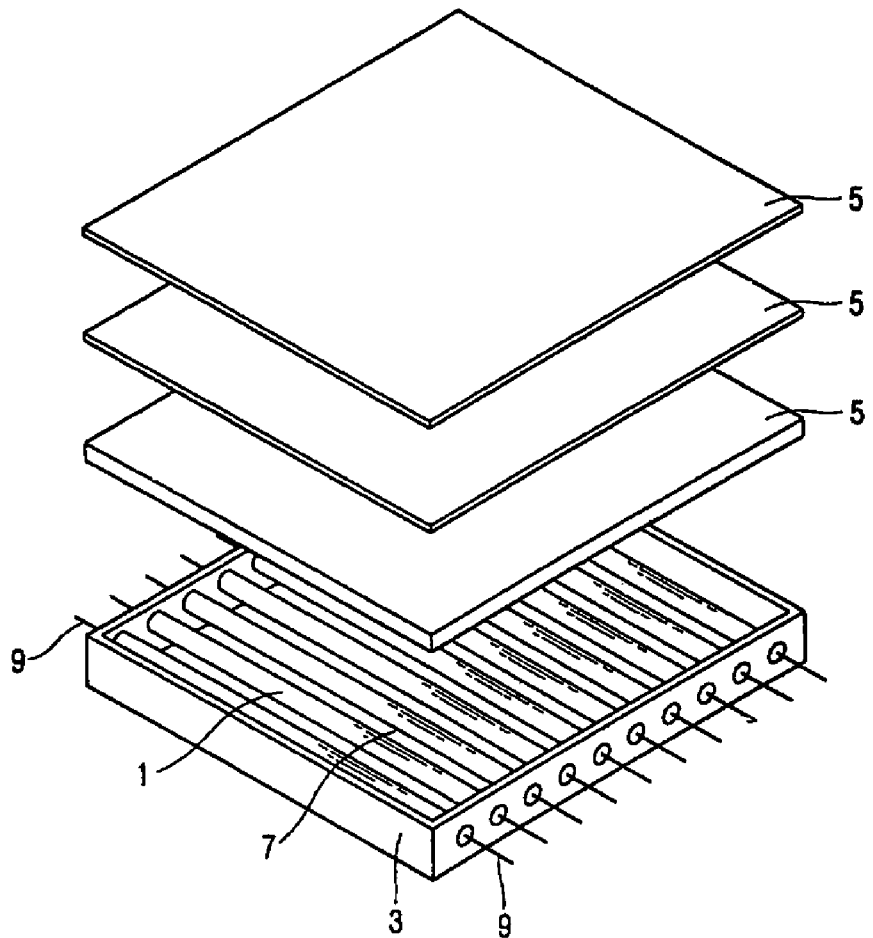
FIG. 1 is an exploded perspective view showing a structure of a direct type backlight in accordance with the related art.
Figure 2:
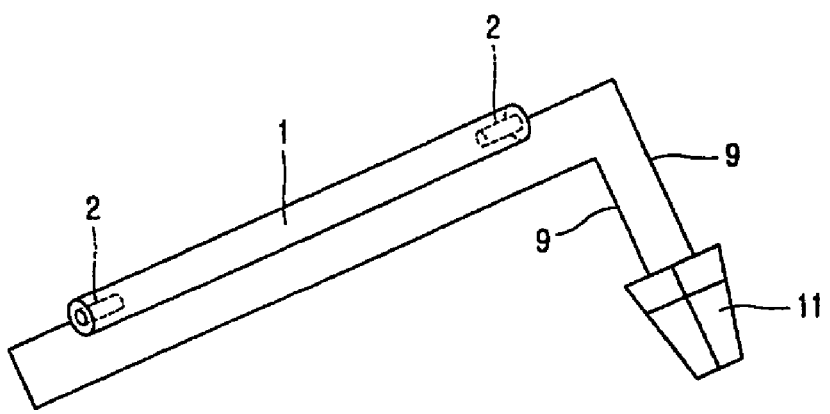
FIG. 2 is a schematic diagram showing a fluorescent lamp in accordance with the related art.
Figure 3A:
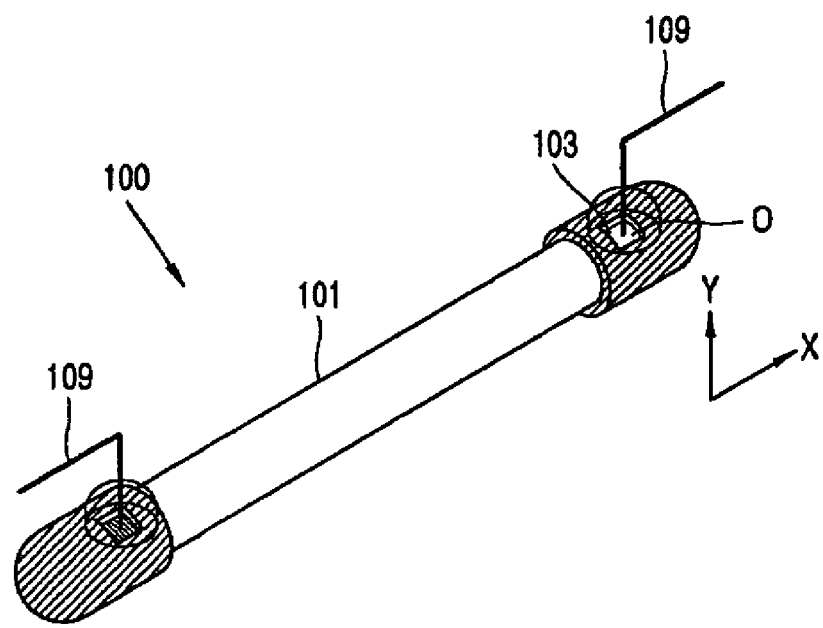
FIGS. 3A, 3B and 3C are, respectively, a perspective view and sectional views of an external electrode fluorescent lamp in accordance with the present invention.
Figure 3B:
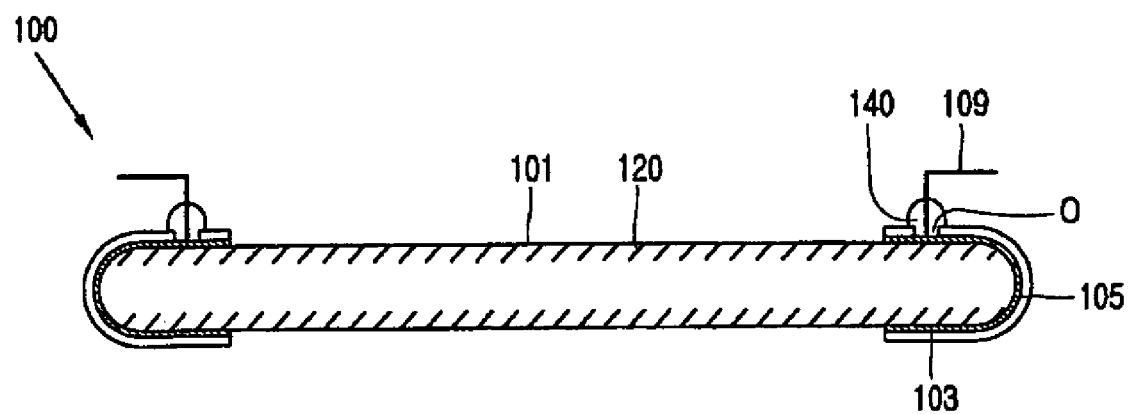
Figure 3C:
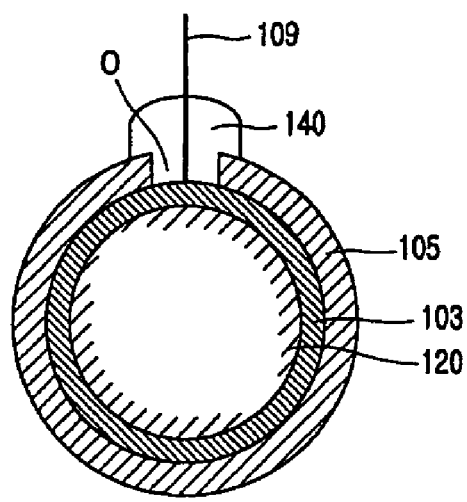

FIG. 3A is a perspective view of an external electrode fluorescent lamp in accordance with the present invention, and FIGS. 3B and 3C are, respectively, a cross-sectional views of the external electrode fluorescent lamp in the direction of X and Y.

As shown in Figures, the external electrode fluorescent lamp 100 includes a cylindrical glass tube 101, external electrodes 103 covering both end portions of the glass tube 101, insulation films 105 sealing each external electrode 103 and each having an opening (o) exposing a portion of the corresponding external electrode 103, and electrode connecting leads 109 connected with the external electrodes 103 through the insulation film 105 sealing the external electrodes 103 and the openings (o) to enable the application of power thereto from an external power source (not shown).

A phosphor layer 120 is coated at an inner circumferential surface of the glass tube 101. After a discharge gas of an inert gaseous mixture or mercury (Hg) is injected into the phosphor layer-coated glass tube 101, both ends of the glass tube are sealed. Although not shown, the transverse section profile of the glass tube 101 can have a circular shape, a flat oval shape or an integrally bent multiple cylindrical shape.

The external electrodes 103 cover the outer circumferential surfaces of both end portions of the sealed glass tube 101 and enable the application of a voltage to the interior of the glass tube 101. A high frequency voltage applied to the interior of the glass tube 101 via the external electrodes 103 causes discharging inside the glass tube 101 between the external electrodes 103. Ultraviolet rays generated by the discharging make the phosphor layer 120 coated at the inner surface of the glass tube 101 fluoresce, and accordingly, light generated by the discharging is radiated externally from the glass tube 101 and irradiated to an irradiation subject (e.g., a liquid crystal panel).

The insulation film 105, which is made of an insulation material such as a thermally contractive resin and which covers the outer circumferential surfaces of both end portions of the external electrode 103, seals the external electrode 103 so that the external electrodes 103 cannot be exposed to an external air space and thus cannot be affected by the high voltage high frequency electrical energy applied to drive the lamp 100.

The insulation film 105 includes the openings (o) exposing a portion of the external electrodes 103, and the electrode connecting leads 109, formed of a conductor, enable the application of a continuous high frequency voltage or a pulse type high frequency voltage to the external electrodes 103 through the openings (o). In addition, a plurality of such external electrode fluorescent lamps can be electrically connected together through their openings (o). In this case, the openings (o) are not limited in their size and shape.

The openings (o), through which the external electrodes 103 and the electrode connecting leads 109 are connected, are sealed with a sealant 140 made of a material such as silicone. In this way, the connections between the external electrodes 103 and the electrode connecting leads 109 can be stably maintained and no portion of the external electrodes 103 is exposed.

Figure 4:
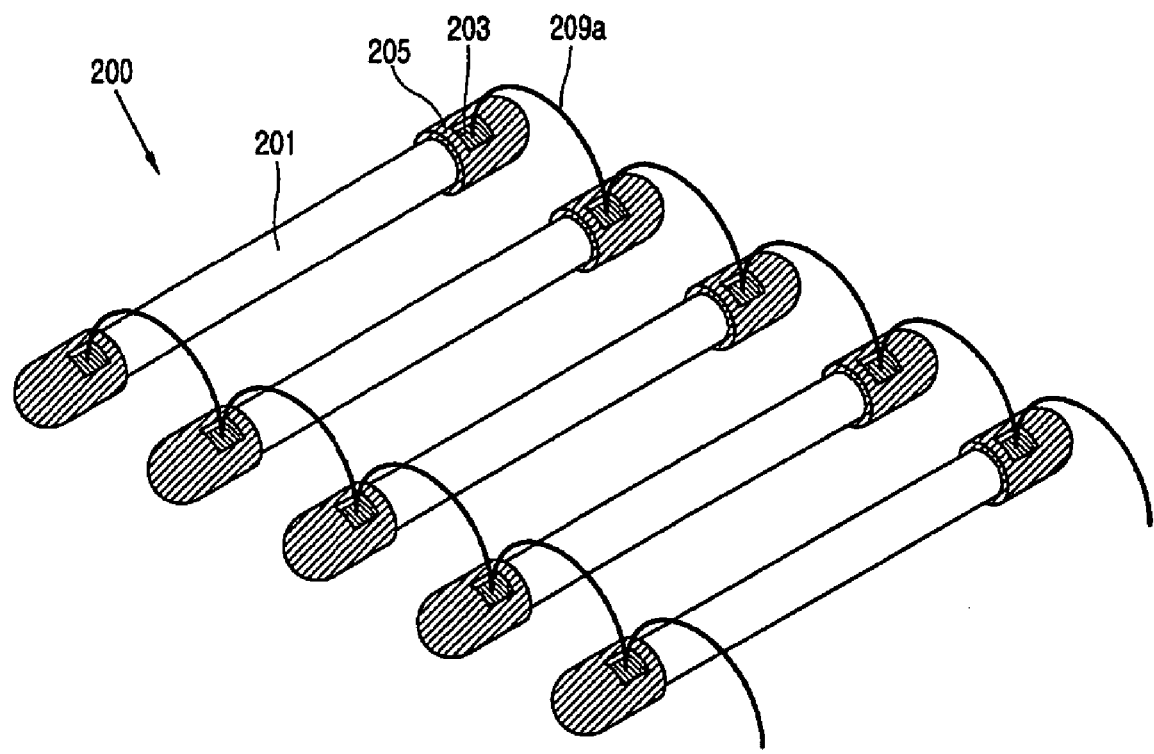
FIG. 4 is a perspective view showing a plurality of electrically connected external electrode fluorescent lamps in accordance with the present invention.

FIG. 4 shows a plurality of external electrode fluorescent lamps according to the present invention externally connected together.

The external electrode fluorescent lamps 200 are all simultaneously connected in parallel via electrode connecting leads 209a so as to be connected to a driving circuit through one connector, so that the number of required connectors can be considerably reduced compared to the related art. Thus, wiring (interconnection) to the driving circuit can be simplified and efficiency and productivity of the manufacturing operation of, for example, a backlight, can be maximized.

The electrode connecting leads 209a connecting the external electrodes 203 can be a wire made of a flexible material, a conductor plate maintaining a certain form or a printed circuit board (PCB) with a patterned electrode connecting lead.

A method for fabricating the external electrode fluorescent lamp in accordance with the present invention will now be described in detail.

Figure 5A:
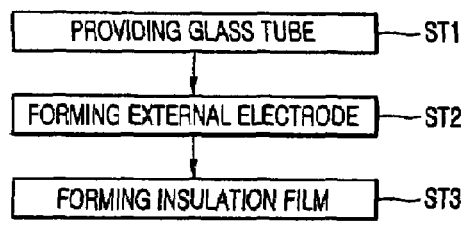
FIG. 5A is a process flow chart of a method for fabricating the external electrode fluorescent lamp in accordance with the preferred embodiment of the present invention.

As shown in FIG. 5A, the method for fabricating the external electrode fluorescent lamp includes the following processes: providing a cylindrical glass tube (ST1), forming external electrodes on the end portions of the glass tube (ST2), and forming respective insulation films each having an opening exposing a portion of the corresponding external electrode and sealing the external electrodes (ST3).

First, the step of providing the cylindrical glass tube (ST1) includes forming a phosphor layer on an inner circumferential surface thereof, injecting a discharge gas into the glass tube, and sealing both ends of the glass tube.

Next, the process for forming the external electrodes 103 in the second step ST2 may employ a plating process or a sintering process. In the plating process, the external electrodes 103 are formed by using a metal material such as nickel (Ni) or the like. Namely, the external electrodes 103 are formed by thinly plating a metal, such as electrodeless nickel, onto the outer surface at both end portions of the glass tube 101.

In the sintering process, metal powder such as silver (Ag) is dispersed in a thermoplastic binder (not shown) to form a conductive paste, a small amount of the conductive paste is injected into a mold (not shown) for forming the external electrode 103, and portions of the glass tube 101 at which the external electrodes 103 are to be formed are dipped in and taken out of the mold including the conductive paste, and then, fired in a high temperature state to thereby form the external electrodes 103. The temperature for firing can differ depending on the type of the conductive paste, and in this case, the temperature is preferably 150° C. or lower.

Besides, there are various other possible methods for forming the external electrode 103. As one example, a taping method may use a tape made of aluminum (Al) or copper (Cu) as a material of the external electrodes 103, in which the external electrodes 103 can be formed by covering the glass tube 101 with the tape. As another example, the external electrodes 103 may be formed by covering a capsule (not shown) at both ends of the glass tube 101.

Subsequently, the insulation film 105 is formed on the external electrodes 103 in the third step ST3 for fabricating the external electrode fluorescent lamp 100.

Figure 5B:
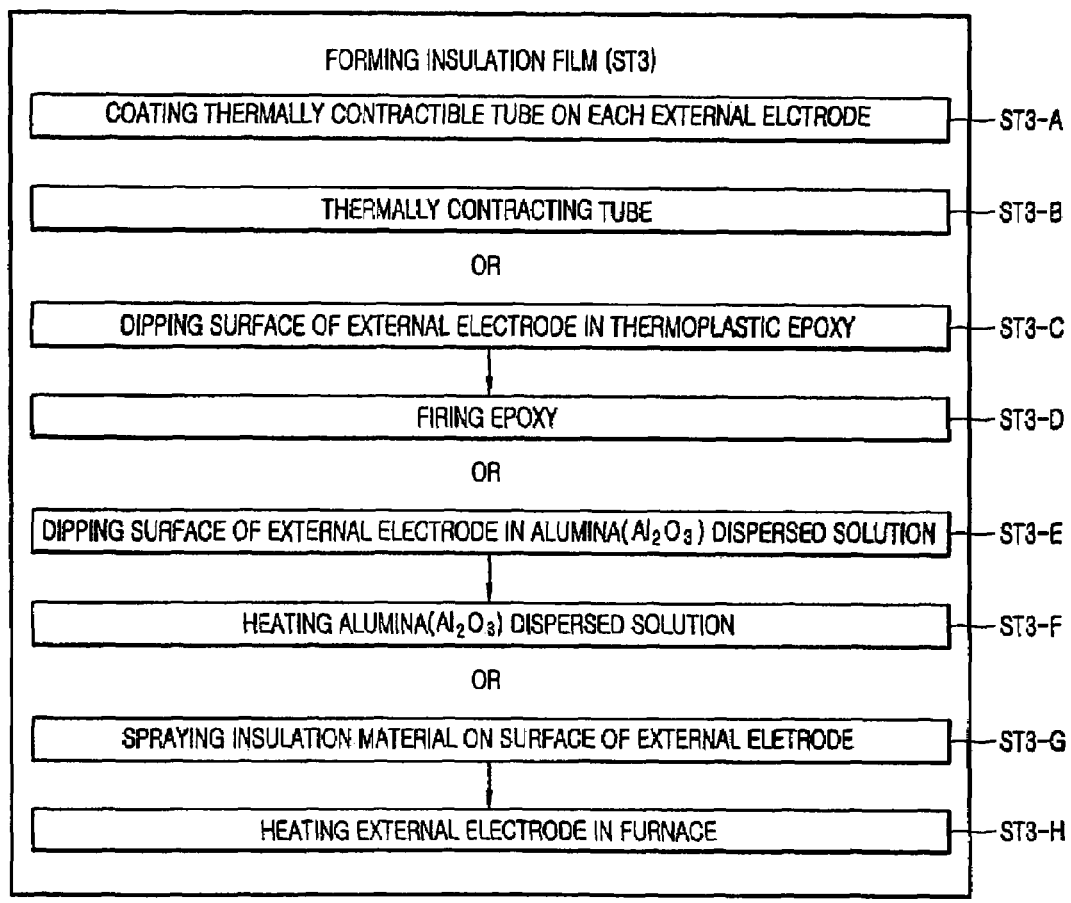
FIG. 5B is a flow chart of a method for fabricating an insulation film in accordance with the preferred embodiment of the present invention.

FIG. 5B shows the processes of various methods for forming the insulation film 105.

In detail, methods for forming the insulation film 105 include a coating method using a thermally contractive material, a sintering method and the like.

First, the insulation film 105 can be formed by a coating method such that a thermally contractible (i.e., 'heat shrinkable') resin tube is coated at an outer surface of the external electrodes 103 (ST3-A) and then thermally contracted so as to be tightly attached on the surface of the external electrodes 103. As the thermally contractive resin tube, a thermally contractive polyethylene terephthalate resin, a polyimide resin or a fluorine-based resin can be used. The thermally contractive resin can be formed in a simple film type and coated onto the surface of the external electrodes 103.

Also, the insulation film 105 can be formed by a sintering method. In the sintering method, the external electrodes 103 are dipped in thermoplastic epoxy solution or paste and taken out (ST3-C). The epoxy solution or the paste-covered external electrodes are then fired at a high temperature (ST3-D) to remove binders, thereby forming the insulation film 105. The firing temperature can differ according to the type of the thermoplastic solution or paste, and in case of a low temperature firing, the insulation film-forming coating is fired at a temperature of about 100° C.~150° C. In case of a high temperature firing insulation material, it exhibits better surface hardness than the low temperature firing insulation material, but a suitable surface hardness of the insulation film of the external electrode is about 2~3H, so the low temperature firing insulation material with good processibility is sufficient.

Another method for forming the insulation film 105 is to coat the external electrode 103 with an alumina ($Al_2O_3$) dispersed solution. That is, the region of each external electrode 103 to be coated is dipped into the alumina dispersed solution (ST3-E), taken out, and then heated to a temperature of about 100° C.~300° C. for 10~20 minutes (ST3-F). The reason for using alumina is because alumina is an insulator and is an easily coated material.

Besides, there is an electric insulation coating method in which an insulation material can be sprayed onto the surfaces of the external electrodes 103 by using an air spray gun (ST3-G) and then thermally heated in a furnace at a temperature at which the material melts (ST3-H), so as to be electrically insulated from outside.

As so far described, the EEFL 100 of the present invention has many advantages, making its use in LCD backlights especially advantageous.

That is, for example, first, since the external electrodes 103 formed at the outer side of both ends of the glass tube are sealed with the insulation film 105, the external electrodes 103 are not exposed to the air and thus are not affected by high voltage high frequency electric energy being applied thereto. Thus, electrical and mechanical reliability of the external electrode fluorescent lamp 100 can be enhanced.

In addition, since a plurality of such external electrode fluorescent lamps 100 can be all connected to the connecting unit and connected to a driving circuit through only one connector, the number of required connectors can be considerably reduced compared to the conventional art. Thus, wiring (interconnection) with the driving circuit can be simplified and efficiency and productivity of the manufacturing operation of a backlight can be maximized.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An external electrode fluorescent lamp comprising:
   a glass tube;
   an external electrode installed at each end portion of the glass tube;
   an insulation film sealing each external electrode, the insulation film of each external electrode having an opening exposing a portion of each external electrode; and
   an electrode connecting lead connected with the exposed portion of each external electrode through the corresponding opening in the insulation film thereon.

2. The fluorescent lamp of claim 1, further comprising a sealant sealing each opening.

3. The fluorescent lamp of claim 1, wherein the insulation film is made of a thermally contractive tube.

4. The fluorescent lamp of claim 3, wherein the thermally contractive tube is made of a resin selected from the group consisting of a polyethylene terephthalate resin, a polyimide resin and a fluorine-based resin.

5. The fluorescent lamp of claim 1, wherein the insulation film is made of epoxy.

6. The fluorescent lamp of claim 1, wherein the insulation film is made of alumina ($Al_2O_3$).

7. The fluorescent lamp of claim 1, wherein a plurality of such external electrode fluorescent lamps are connected together in parallel via the electrode connecting leads thereof.

8. A liquid crystal display having a backlight, the backlight comprising:
   at least one external electrode fluorescent lamp, the external electrode fluorescent lamp including:
   a glass tube having a phosphor layer and a discharge gas therein;
   an external electrode installed at each end portion of the glass tube; and an insulation film sealing each external electrode, the insulation film of each external electrode having an opening exposing a portion of each external electrode; and an electrode connecting lead connected with the exposed portion of each external electrode through the corresponding opening in the insulation film.

9. The liquid crystal display of claim 8, wherein a plurality of said external electrode fluorescent lamps are connected together in parallel via the electrode connecting leads thereof.

* * * * *